United States Patent
Lee et al.

(10) Patent No.: US 11,306,912 B2
(45) Date of Patent: Apr. 19, 2022

(54) HEAT PUMP SYSTEM FOR PRODUCING STEAM BY USING RECUPERATOR

(71) Applicant: KOREA INSTITUTE OF ENERGY RESEARCH, Daejeon (KR)

(72) Inventors: Beom Joon Lee, Sejong-si (KR); Gil Bong Lee, Daejeon (KR); Young Jin Baik, Daejeon (KR); Hyung Ki Shin, Sejong-si (KR); Jun Hyun Cho, Sejong-si (KR); Chui Woo Roh, Sejong-si (KR); Ho Sang Ra, Daejeon (KR); Eun Seok Wang, Daejeon (KR); Young Soo Lee, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 376 days.

(21) Appl. No.: 16/472,570

(22) PCT Filed: Nov. 1, 2017

(86) PCT No.: PCT/KR2017/012262
§ 371 (c)(1),
(2) Date: Jun. 21, 2019

(87) PCT Pub. No.: WO2018/117399
PCT Pub. Date: Jun. 28, 2018

(65) Prior Publication Data
US 2019/0323704 A1   Oct. 24, 2019

(30) Foreign Application Priority Data

Dec. 23, 2016  (KR) ........................ 10-2016-0177477

(51) Int. Cl.
*F22B 3/00*      (2006.01)
*F01K 21/00*    (2006.01)
(Continued)

(52) U.S. Cl.
CPC .............. *F22B 3/00* (2013.01); *F01K 21/005* (2013.01); *F22B 37/263* (2013.01); *F25B 30/02* (2013.01); *F25B 30/06* (2013.01); *F25B 41/20* (2021.01)

(58) Field of Classification Search
CPC ......................................................... F22B 3/00
See application file for complete search history.

(56) References Cited

U.S. PATENT DOCUMENTS 4,565,161 A * 1/1986 Choquette ............... F22B 3/045
                                                                  122/32
7,870,717 B2   1/2011 MacKnight
(Continued)

FOREIGN PATENT DOCUMENTS

KR    10-1071409 B1    10/2011
KR    10-1176571 B1    8/2012
(Continued)

*Primary Examiner* — Nathaniel Herzfeld
(74) *Attorney, Agent, or Firm* — Birch, Stewart, Kolasch & Birch, LLP (57) ABSTRACT

In the present invention, a recuperator is used in a refrigerant cycle to make a heat exchange between a refrigerant generated in a condenser and a refrigerant before flowing into a compressor, thereby supercooling the refrigerant to minimize the quality of the refrigerant introduced into an evaporator, elevating temperatures at an inlet and an outlet of the compressor, and increasing condensed heat of the condenser. In the present invention, a recuperator is used to increase condensed heat of the condenser, leading to increasing the heat which circulation water circulating in a steam producing cycle receives from the condenser, whereby steam production efficiency can be improved.

11 Claims, 9 Drawing Sheets

(51) Int. Cl.
*F22B 37/26* (2006.01)
*F25B 30/02* (2006.01)
*F25B 30/06* (2006.01)
*F25B 41/20* (2021.01)

(56) References Cited

U.S. PATENT DOCUMENTS

| | | | |
|---|---|---|---|
| 9,206,710 B2 * | 12/2015 | Gurin | F01K 15/02 |
| 2012/0000236 A1 * | 1/2012 | Ogata | F25B 9/008 |
| | | | 62/324.2 |
| 2015/0226453 A1 * | 8/2015 | Nomoto | F24D 19/0092 |
| | | | 62/238.7 |

FOREIGN PATENT DOCUMENTS

| | | |
|---|---|---|
| KR | 10-1679782 B1 | 11/2016 |
| KR | 10-2016-0142907 A | 12/2016 |

\* cited by examiner

Fig. 9

HEAT PUMP SYSTEM FOR PRODUCING STEAM BY USING RECUPERATOR

CROSS REFERENCE TO RELATED APPLICATIONS

This application is the National Phase of PCT International Application No. PCT/KR2017/012262, filed on Nov. 1, 2017, which claims priority under 35 U.S.C. 119(a) to Patent Application No. 10-2016-0177477, filed in the Republic of Korea on Dec. 23, 2016, all of which are hereby expressly incorporated by reference into the present application.

BACKGROUND OF THE INVENTION

Field of the Invention

The present invention relates to a heat pump system for producing steam by using a recuperator, and more particularly, to a heat pump system for producing steam by using a recuperator, in which the recuperator is used to increase condensed heat so that steam production efficiency can be maximized.

Discussion of the Related Art

In general, heat pump systems for producing steam include a compressor, a condenser, an evaporator, and an expansion device and supply water to the condenser so as to produce water as steam by using condensed heat generated in the condenser. Steam and water generated in the condenser pass through a phase separator, and water separated by the phase separator is re-supplied to the condenser by using a pump. The phase separator extracts only steam, and extracted steam is used in a necessary process.

However, heat pump systems for producing steam according to the related art have limitations in a heat exchange amount of the condenser.

SUMMARY OF THE INVENTION

The present invention provides a heat pump system for producing steam by using a recuperator, in which condensed heat of a condenser is increased so that steam production efficiency can be maximized.

According to an aspect of the present invention, there is provided a heat pump system for producing steam by using a recuperator, the heat pump system including: a refrigerant cycle, which includes a compressor compressing a refrigerant, a condenser condensing the refrigerant generated in the compressor, an expansion device expanding the refrigerant generated in the condenser and an evaporator evaporating the refrigerant generated in the expansion device and in which the refrigerant circulates; a steam producing cycle, which includes a flash tank generating steam by decompressing circulation water heated while passing through the condenser and a pump pumping the circulation water generated in the flash tank so as to circulate the circulation water into the condenser and in which the circulation water is circulated so that steam is capable of being produced; and a recuperator, which is provided within the refrigerant cycle, heat-exchanges the refrigerant generated in the condenser with the refrigerant introduced into the compressor so as to supercool the refrigerant generated in the condenser and elevates temperatures at an inlet and an outlet of the compressor so as to increase condensed heat of the condenser.

According to another aspect of the present invention, there is provided a heat pump system for producing steam by using a recuperator, the heat pump system including: a refrigerant cycle, which includes a compressor compressing a refrigerant, a heat exchanger heat-exchanging the refrigerant generated in the compressor with first circulation water, a condenser condensing the refrigerant by heat-exchanging the refrigerant generated in the heat exchanger with second circulation water, an expansion device expanding the refrigerant generated in the condenser and an evaporator evaporating the refrigerant generated in the expansion device and in which the refrigerant circulates; a first steam producing cycle, which includes a first flash tank generating first steam by decompressing the first circulation water heated while passing through the heat exchanger and a first pump pumping the first circulation water generated in the first flash tank so as to circulate the first circulation water into the heat exchanger and in which the first circulation water is circulated so that first steam is capable of being produced; a second steam producing cycle, which includes a second flash tank generating second steam by decompressing the circulation water heated while passing through the condenser and a pump pumping the second circulation water generated in the second flash tank so as to circulate the second circulation water into the condenser and in which the second circulation water is circulated so that second steam is capable of being produced; and a recuperator, which is provided within the refrigerant cycle, heat-exchanges the refrigerant generated in the condenser with the refrigerant introduced into the compressor so as to supercool the refrigerant generated in the condenser and elevates temperatures at an inlet and an outlet of the compressor so as to increase condensed heat of the condenser.

Advantageous Effects

According to the present invention, a refrigerant generated in a condenser and a refrigerant before flowing into a compressor are heat-exchanged by using a recuperator in a refrigerant cycle so that the refrigerant is supercooled and quality of the refrigerant introduced into an evaporator can be minimized, temperatures at an inlet and an outlet of the compressor can be elevated and condensed heat of the condenser can be increased.

According to the present invention, condensed heat of the condenser is increased by using the recuperator so that the heat which circulation water circulating in a steam producing cycle receives from the condenser, is increased and thus steam production efficiency can be improved.

DETAILED DESCRIPTION OF THE EMBODIMENTS

Hereinafter, exemplary embodiments of the present invention will be described in detail with reference to the accompanying drawings.

Figure 1:
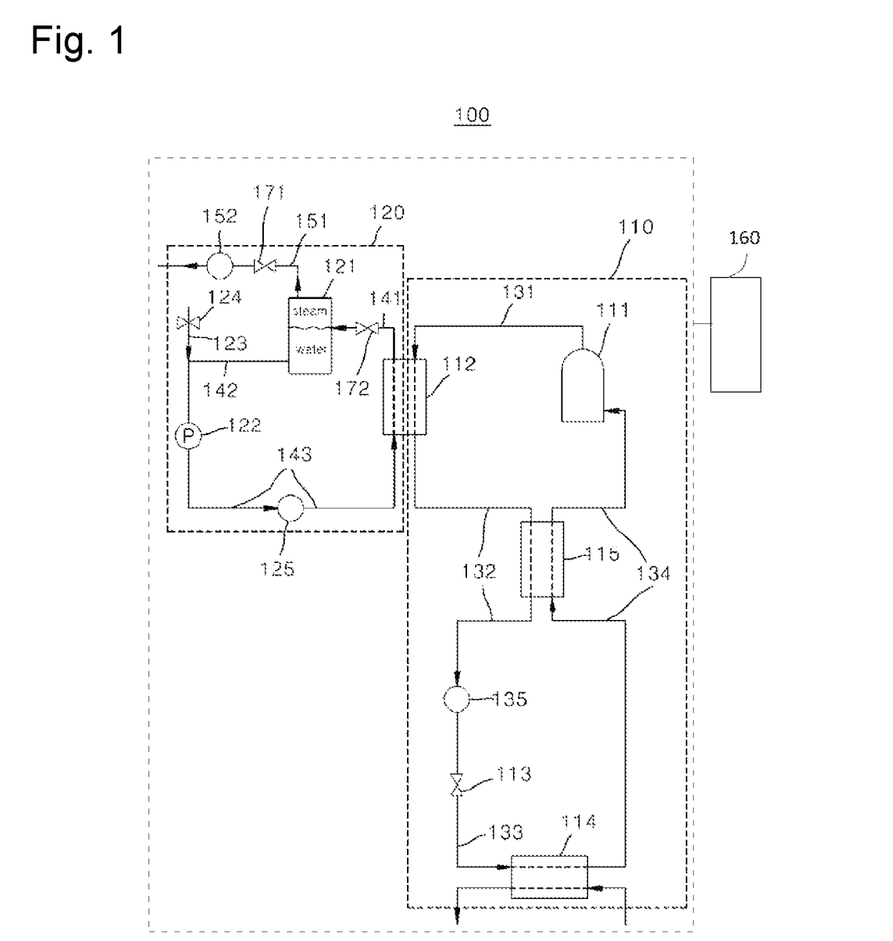
FIG. 1 is a view illustrating the schematic configuration of a heat pump system for producing steam according to a first embodiment of the present invention.

FIG. 1 is a view illustrating the schematic configuration of a heat pump system for producing steam according to a first embodiment of the present invention.

Referring to FIG. 1, a heat pump system 100 for producing steam according to the first embodiment of the present invention includes a refrigerant cycle 110, a steam producing cycle 120, and a controller 160.

The refrigerant cycle 110 is a cycle in which a refrigerant circulates. An example in which R245fa is used as the refrigerant, will be described.

The refrigerant cycle 110 includes a compressor 111, a condenser 112, an expansion device 113, an evaporator 114, and a recuperator 115.

The compressor 111 compresses the refrigerant that circulates in the refrigerant cycle 110. The compressor 111 and the condenser 112 are connected to each other via a first refrigerant flow path 131. The compressor 111 is an inverter compressor.

The condenser 112 condenses the refrigerant generated in the compressor 111. The condenser 112 and the expansion device 113 are connected to each other via a second refrigerant flow path 132.

The expansion device 113 expands the refrigerant, which is generated in the condenser 112 and passes through the recuperator 115. The expansion device 113 and the evaporator 114 are connected to each other via a third refrigerant flow path 133.

The evaporator 114 evaporates the refrigerant generated in the expansion device 113. The evaporator 114 and the compressor 111 are connected to each other via a fourth refrigerant flow path 134.

The recuperator 115 is an internal heat exchanger, which is installed between the second refrigerant flow path 132 and the fourth refrigerant flow path 134. The recuperator 115 heat-exchanges the refrigerant generated in the condenser 112 with the refrigerant introduced into the compressor 111. Thus, the recuperator 115 supercools the refrigerant generated in the condenser 112, minimizes the quality of the refrigerant at an inlet of the evaporator 114 and elevates temperatures at an inlet and an outlet of the compressor 111, thereby increasing condensed heat of the condenser.

A refrigerant flowmeter 135 that measures the flow rate of the refrigerant generated in the recuperator 115 is installed on the second refrigerant flow path 132. The refrigerant flowmeter 135 may not be installed.

The controller 160 controls driving of the compressor 111 according to the flow rate measured by the refrigerant flowmeter 135.

Meanwhile, the steam producing cycle 120 is a cycle in which circulation water circulates and which receives a heat source from the refrigerant cycle 110 so as to produce steam.

The steam producing cycle 120 includes a flash tank 121, a pump 122, a make-up water injecting part 123, a make-up water valve 124, and a circulation water flowmeter 125. The circulation water flowmeter 125 may not be installed.

The flash tank 121 is a device that decompresses the circulation water heated while passing through the condenser 112 so as to produce steam. The flash tank 121 and the condenser 112 are connected to each other via a circulation water flow path 141. A steam discharge flow path 151 is connected to an upper portion of the flash tank 121. The steam discharge flow path 151 is a flow path on which the steam produced in the flash tank 121 is supplied to a steam demander.

A steam flowmeter 152 that measures the flow rate of the steam is installed on the steam discharge flow path 151. The steam flowmeter 152 may not be installed.

The pump 122 pumps the circulation water generated in the flash tank 121 so as to re-circulate the circulation water into the condenser 112. The pump 122 and the flash tank 121 are connected to each other via a second circulation water flow path 142.

The make-up water injecting part 123 is connected to the second circulation water flow path 142 and makes-up water from the outside. The make-up water may use waste heat, high-temperature water, such as waste water, etc.

In the present embodiment, an example in which the make-up water injecting part 123 is connected to the second circulation water flow path 142, will be described. However, the embodiment is not limited thereto, and of course, the make-up water injecting part 123 may be connected directly to the flash tank 121 so as to supply the make-up water directly to the flash tank 121.

The make-up water valve 124 is a valve for controlling the flow rate of water made-up by the make-up water injecting part 123.

The controller 160 controls the amount of an opening degree of the make-up water valve 124 according to a water level of the flash tank 121. That is, the opening degree of the make-up water valve 124 is controlled so that the water level of the flash tank 121 can be maintained at a predetermined water level.

The pump 122 and the condenser 112 are connected to each other via a third circulation flow path 143.

The circulation water flowmeter 125 is installed on the third circulation flow path 143 and measures the flow rate of the circulation water pumped by the pump 122.

Meanwhile, the heat pump system 100 for producing steam according to the first embodiment of the present invention further includes a flash tank pressure sensor (not shown), a first pressure control valve 171, and a second pressure control valve 172.

The flash tank pressure sensor (not shown) measures an internal pressure of the flash tank 121.

The first pressure control valve 171 is installed on the steam discharge flow path 151. The opening degree of the first pressure control valve 171 is controlled according to pressure sensed by the flash tank pressure sensor (not shown).

The second pressure control valve 172 is installed on the circulation water discharge flow path 141. The opening degree of the second pressure control valve 172 is controlled according to a change of the flow rate sensed by the circulation water flowmeter 125.

An operation of the heat pump system for producing steam by using a recuperator according to the first embodiment of the present invention having the above configuration will be described as below.

First, in the refrigerant cycle 110, the refrigerant compressed by the compressor 111 flows into the condenser 112.

In the condenser 112, the refrigerant compressed by the compressor 111 and the circulation water that circulates in the steam producing cycle 120 are heat-exchanged. In the condenser 112, the refrigerant is condensed, and the circulation water absorbs heat and is heated.

The refrigerant generated in the condenser 112 is introduced into the recuperator 115.

In the recuperator 115, the refrigerant condensed by the condenser 112 and the refrigerant before flowing into the compressor 111 are heat-exchanged.

Figure 2:
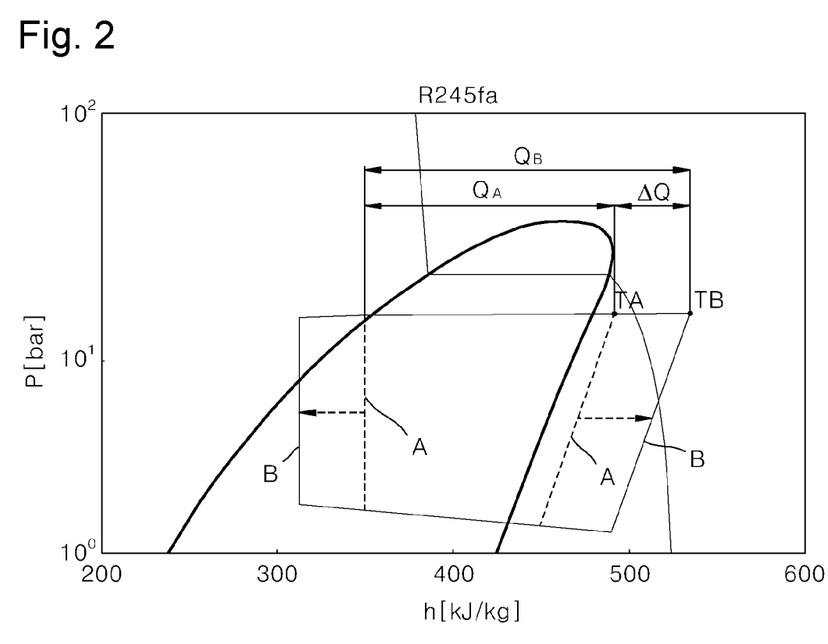
FIG. 2 is a p-h diagram of a refrigerant cycle illustrated in FIG. 1.

FIG. 2 is a p-h diagram of a refrigerant cycle illustrated in FIG. 1.

Referring to FIG. 2, A represents the conventional case where no recuperator is used, and B represents the case where the recuperator 115 is used.

Heat-exchanging in the recuperator 115 is performed so that the refrigerant is supercooled by heat lost and the refrigerant, which is generated in the evaporator 114 and before flowing into the compressor 111, absorbs heat, and the temperature of the refrigerant is elevated. When the refrigerant condensed by the condenser 112 is supercooled, the quality of the refrigerant at an inlet of the evaporator 114 may be minimized.

Thus, the temperature of the refrigerant at an inlet of the compressor 111 is elevated. When the temperature of the refrigerant at the inlet of the compressor 11I is elevated, the temperature of the refrigerant at a discharge side of the compressor 111 is also elevated.

Referring to FIG. 2, in the conventional case A in which the recuperator 115 is not used, a discharge temperature TA of the compressor 111 is about 130° C., and in the case B where the recuperator 115 is used, according to the present embodiment, a discharge temperature TB of the compressor 111 is about 180° C. Thus, the discharge temperature of the compressor 111 is elevated.

Also, condensed heat $Q_B$ of the condenser 112 in the case B of the present invention in which the recuperator 115 is used, is increased by $\Delta Q$ compared to condensed heat QA of the condenser in the conventional case A in which the recuperator 115 is not used. An increment $\Delta Q$ in the condensed heat is about 30 to 40%.

As described above, the recuperator 115 is used in the refrigerant cycle 110 so that the condensed heat of the condenser 112 can be increased.

When the condensed heat of the condenser 112 is increased, the heat absorbed from the condenser 112, of the circulation water at a high pressure that passes through the condenser 112 in the steam producing cycle 120 is increased so that the temperature of the circulation water can be further elevated.

Since the temperature of the circulation water heated in the condenser 112 can be further elevated, the temperature of the circulation water supplied to the flash tank 121 can be sufficiently elevated. When the temperature of the circulation water supplied to the flash tank 121 is high, a steam production rate in the flash tank 121 can be improved.

The temperature of the circulation water heated in the condenser 112 and supplied to the flash tank 121 is about 123° C. to 125° C., and the temperature of steam decompressed in the flash tank 121 and produced therein is about 120° C.

As described above, in the present invention, the recuperator 115 is used in the refrigerant cycle 110 so that the condensed heat of the condenser 112 is increased and thus high-temperature steam can be produced in the flash tank 121.

A method for controlling the steam producing cycle 120 by using the controller 160 will be described as follows.

The controller 160 reduces a pumping flow rate of the pump 122 when the temperature of the refrigerant discharged from the compressor 111 is less than a predetermined temperature. That is, when it is determined that the temperature of the refrigerant discharged from the compressor 111 is not sufficient, the controller 160 reduces the pumping flow rate of the pump 122.

Also, the controller 160 reduces the opening degree of the first pressure control valve 171 when an internal pressure of the flash tank 121 measured by the flash tank pressure sensor (not shown) is less than a first predetermined pressure P1. When the opening degree of the first pressure control valve 171 is reduced, the internal pressure of the flash tank 121 is increased. When the internal pressure of the flash tank 121 is less than the first predetermined pressure P1, the temperature of steam in the flash tank 121 is reduced. Thus, the opening degree of the first pressure control valve 171 is reduced until the internal pressure of the flash tank 121 reaches the first predetermined pressure P1.

Also, the controller 160 controls the amount of the opening degree of the make-up water valve 124 according to the water level of the flash tank 121. That is, the opening degree of the make-up water valve 124 is controlled so that the water level of the flash tank 121 can be maintained at a predetermined water level.

Figure 3:
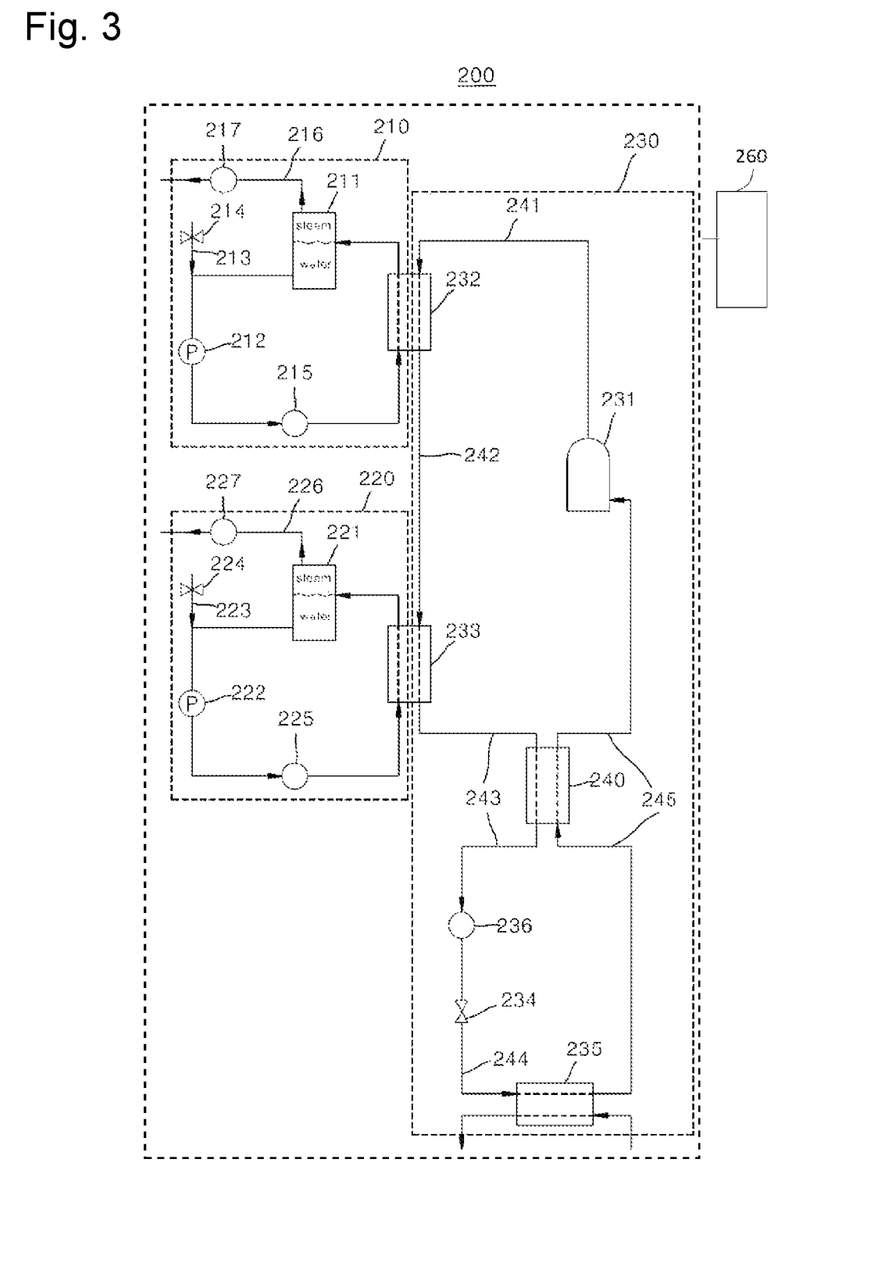
FIG. 3 is a view illustrating the configuration of a heat pump system for producing steam according to a second embodiment of the present invention.
Figure 4:
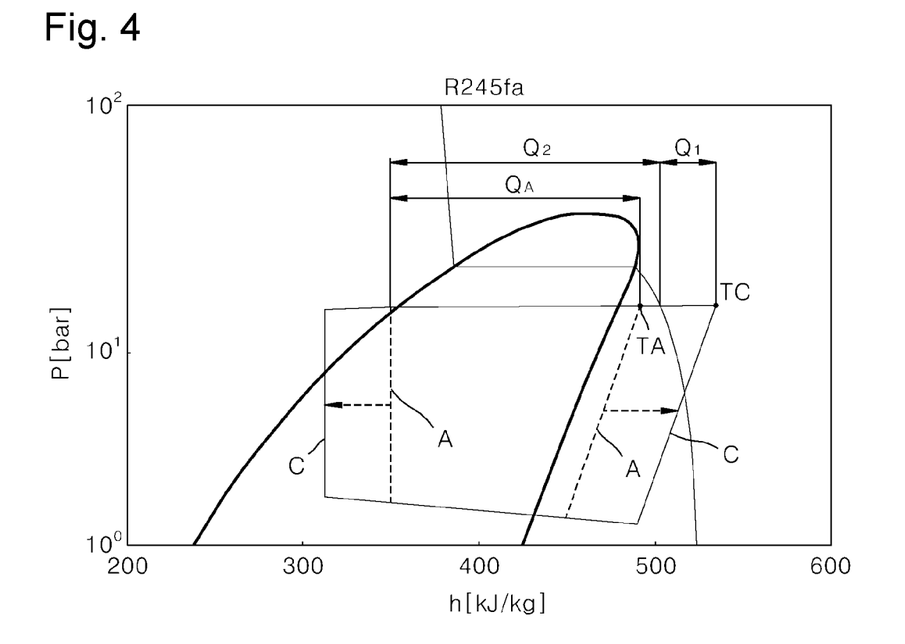
FIG. 4 is a p-h diagram of a refrigerant cycle illustrated in FIG. 3.

FIG. 3 is a view illustrating the configuration of a heat pump system for producing steam according to a second embodiment of the present invention. FIG. 4 is a p-h diagram of a refrigerant cycle illustrated in FIG. 3.

Referring to FIGS. 3 and 4, a heat pump system 200 for producing steam according to the second embodiment of the present invention is different from the first embodiment in that the heat pump system 200 for producing steam according to the second embodiment includes one refrigerant cycle 230 and first and second steam producing cycles 210 and 220, a refrigerant compressed by a compressor 231 of the refrigerant cycle 230 passes through a heat exchanger 232 and a condenser 233 sequentially and the first steam producing cycle 210 receives a heat source from the heat exchanger 232 and the second steam producing cycle 220 receives a heat source from the condenser 233, and the remaining features and effects thereof are similar and thus, only different features will be described in detail.

The refrigerant cycle 230 is a cycle in which the refrigerant circulates. An example in which R245fa is used as the refrigerant, will be described.

The refrigerant cycle 230 includes the compressor 231, the heat exchanger 232, the condenser 233, an expansion device 234, the evaporator 235, and a recuperator 240.

The compressor 231 compresses the refrigerant that circulates in the refrigerant cycle 230. The compressor 231 and the heat exchanger 232 are connected to each other via a first refrigerant flow path 241. The compressor 231 is an inverter compressor.

The heat exchanger 232 heat-exchanges the overheated refrigerant generated in the compressor 231 with first circulation water that circulates in the first steam producing cycle 210. The heat exchanger 232 is an overheat heat exchanger that transfers sensible heat of the refrigerant to the first circulation water.

The condenser 233 condenses the refrigerant generated in the heat exchanger 232. The heat exchanger 232 and the condenser 233 are connected to each other via a second refrigerant flow path 242, and the condenser 233 and the expansion device 234 are connected to each other via a third refrigerant flow path 243. The condenser 233 transfers latent heat of the refrigerant to second circulation water.

The expansion device 234 expands the refrigerant that is generated in the condenser 233 and passes through the recuperator 240. The expansion device 234 and the evaporator 235 are connected to each other via a fourth refrigerant flow path 244.

The evaporator 235 evaporates the refrigerant generated in the expansion device 234. The evaporator 235 and the compressor 231 are connected to each other via a fifth refrigerant flow path 245.

The recuperator 240 is an internal heat exchanger installed between the third refrigerant flow path 243 and the fifth refrigerant flow path 245. The recuperator 240 heat-exchanges the refrigerant generated in the condenser 233 with the refrigerant introduced into the compressor 231. Thus, the recuperator 240 supercools the refrigerant generated in the condenser 233, minimizes the quality of the refrigerant at an inlet of the evaporator 235, and elevates temperatures of the refrigerant at an inlet and an outlet of the compressor 231 so that condensed heat of the condenser can be increased.

A refrigerant flowmeter 236 for measuring a flow rate of the refrigerant generated in the recuperator 240 is installed on the third refrigerant flow path 243. The refrigerant flowmeter 236 may not be installed.

Meanwhile, the first steam producing cycle 210 is a cycle in which steam is produced while the first circulation water circulates. The temperature of steam produced in the first steam producing cycle 210 is higher than that of steam produced in the second steam producing cycle 220 that will be described later.

The first steam producing cycle 210 includes a first flash tank 211, a first pump 212, a first make-up water injecting part 213, a first make-up water valve 214, and a first circulation water flowmeter 215.

The first flash tank 211 is a device in which the first circulation water heated while passing through the heat exchanger 232 is decompressed so that steam can be produced.

A first steam discharge flow path 216 is connected to an upper portion of the first flash tank 211. The first steam discharge flow path 216 is a flow path on which the steam produced in the first flash tank 211 is supplied to a steam demander.

A first steam flowmeter 217 for measuring the flow rate of the steam is installed on the first steam discharge flow path 216. The first steam flowmeter 217 may not be installed.

The first pump 212 pumps the first circulation water generated in the first flash tank 211 and re-circulates the first circulation water into the heat exchanger 232.

The first make-up water injecting part 213 is connected to a flow path for connecting the first flash tank 211 to the first pump 212 and makes-up water from the outside.

In the present embodiment, an example in which the first make-up water injecting part 213 is connected to a flow path for connecting the first flash tank 211 to the first pump 212, will be described. However, the embodiment is not limited thereto, and of course, the first make-up water injecting part 213 may be connected directly to the first flash tank 211 so that the make-up water can be supplied directly to the first flash tank 211.

The first make-up water valve 214 is a valve for controlling the flow rate of water made-up from the first make-up water injecting part 213.

The controller 260 controls the amount of an opening degree of the first make-up water valve 214 according to a water level of the first flash tank 211. That is, the opening degree of the first make-up water valve 214 is controlled so that the water level of the first flash tank 211 can be maintained at a predetermined water level.

The first circulation water flowmeter 215 is installed on a flow path for connecting the first pump 212 to the heat exchanger 232 and controls the flow rate of the circulation water pumped by the first pump 212.

Meanwhile, the second steam producing cycle 220 is a cycle in which steam is produced while the second circulation water circulates. The temperature of the steam produced in the second steam producing cycle 220 is lower than the temperature of the steam produced in the first steam producing cycle 210.

The second steam producing cycle 220 includes a second flash tank 221, a second pump 222, a second make-up water injecting part 223, a second make-up water valve 224, and a second circulation water flowmeter 225. The second circulation water flowmeter 225 may not be installed.

The second flash tank 221 is a device for producing steam by decompressing the second circulation water heated while passing through the condenser 233.

A second steam discharge flow path 226 is connected to an upper portion of the second flash tank 221. The second steam discharge flow path 226 is a flow path on which the steam produced in the second flash tank 221 is supplied to a steam demander. The temperature of the steam produced in the second flash tank 221 is comparatively lower than the temperature of the steam produced in the first flash tank 212 and thus, the steam produced in the second flash tank 221 is supplied to the steam demander that requires low-temperature steam.

A second steam flowmeter 227 for measuring the flow rate of the steam is installed on the second steam discharge flow path 226. The second steam flowmeter 227 may not be installed.

The second pump 222 pumps the second circulation water generated in the second flash tank 221 so as to re-circulate the second circulation water into the condenser 233.

The second make-up water injecting part 223 is connected to a flow path for connecting the second flash tank 221 to the second pump 222, thereby making-up water from the outside.

In the present embodiment, an example in which the second make-up water injecting part 223 is connected to a flow path for connecting the second flash tank 221 to the second pump 222, will be described. However, the embodiment is not limited thereto, and of course, the second make-up water injecting part 223 may be connected directly to the second flash tank 221 so as to supply the make-up water directly to the second flash tank 221.

The second make-up water valve 224 is a valve for controlling the flow rate of water made-up from the second make-up water injecting part 223.

The controller 260 controls the amount of an opening degree of the second make-up water valve 224 according to the water level of the second flash tank 221. That is, the opening degree of the second make-up water valve 224 is controlled so that the water level of the second flash tank 221 can be maintained at a predetermined water level.

The second circulation water flowmeter 225 is installed on a flow path for connecting the second pump 222 to the condenser 233 and measures the flow rate of the circulation water pumped by the second pump 222.

An operation of a heat pump system for producing steam by using a recuperator according to the second embodiment of the present invention having the above configuration will be described as below.

In the second embodiment of the present invention, a refrigerating compressed by the compressor 231 passes through the heat exchanger 232 and then passes through the condenser 233.

Heat-exchanging between the refrigerant generated in the compressor 231 and the first circulation water that circulates in the first steam producing cycle 210 is performed by the heat exchanger 232. In the heat exchanger 232, sensible heat of the overheated refrigerant generated in the compressor 232 is transferred to the first circulation water.

The first circulation water is heated when the heat exchanger 232 absorbs sensible heat of the refrigerant.

The refrigerant of which heat is partially lost in the heat exchanger 232, is introduced into the condenser 233. In this case, the refrigerant that passes through the heat exchanger 232 is maintained in a gaseous state, and a change in the state of the refrigerant does not occur.

In the condenser 233, the refrigerant generated in the heat exchanger 232 and the second circulation water that circulates in the second steam producing cycle 220 are heat-exchanged. In the condenser 233, the refrigerant is condensed, and the second circulation water absorbs heat and is heated.

The refrigerating generated in the condenser 233 is introduced into the recuperator 240.

In the recuperator 240, the refrigerant condensed by the condenser 233 and the refrigerant before flowing into the compressor 231 are heat-exchanged.

Referring to FIG. 4, A represents the conventional case where no recuperator is used, and C represents a case where the recuperator 240 is used.

Heat-exchanging in the recuperator 240 is performed so that the refrigerant condensed by the condenser 233 is supercooled, and the refrigerant, which is generated in the evaporator 235 and before flowing into the compressor 231, absorbs heat, and the temperature of the refrigerant is elevated. When the refrigerant is supercooled in the recuperator 240, the quality of the refrigerant at an inlet of the evaporator 235 may be minimized.

Also, the temperature of the refrigerant at an inlet of the compressor 231 is elevated. When the temperature of the refrigerant at the inlet of the compressor 231 is elevated, the temperature of the refrigerant at a discharge side of the compressor 231 is also elevated.

Referring to FIG. 4, in the conventional case A where the recuperator 240 is not used, a discharge temperature TA of the compressor 231 is about 130° C., and in the case C where the recuperator 240 is used according to the present invention, a discharge temperature $T_C$ of the compressor 231 is about 180° C. and thus, the discharge temperature of the compressor 231 is elevated.

Also, in the case C of the present invention in which the recuperator 240 is used, both a sensible heat-exchange amount $Q_1$ of sensible heat of the heat exchanger 231 and condensed heat $Q_2$ of the condenser 233 are used to produce steam. Thus, the sum of the heat $Q_1$ of the heat exchanger 231 and the condensed heat $Q_2$ of the condenser 233 is larger than condensed heat QA of the condenser in the conventional case A in which the recuperator 240 is not used.

As described above, the recuperator 240 is used in the refrigerant cycle 210 so that more heat may be used to produce steam.

Meanwhile, the first circulation water in the first steam producing cycle 210 absorbs heat in the heat exchanger 232 and is supplied to the first flash tank 211. The first circulation water is decompressed by the first flash tank 211 so that steam can be produced in the first flash tank 211.

The second circulation water in the second steam producing cycle 220 absorbs heat in the condenser 233 and is supplied to the second flash tank 221. The second circulation water is decompressed in the second flash tank 221 so that steam can be produced.

In this case, because the temperature of the refrigerant that passes through the heat exchanger 232 is higher than the temperature of the refrigerant that passes through the condenser 233, the temperature of the first circulation water that absorbs heat in the heat exchanger 232 is higher than the temperature of the second circulation water that absorbs heat in the condenser 233.

Thus, the temperature of the steam produced in the first flash tank 221 is higher than the temperature of the steam produced in the second flash tank 221.

The second embodiment of the present invention having the above configuration includes first and second steam producing cycles 210 and 220 so that steams having different temperatures can be produced and thus it is easy to apply the steams to various demanders.

Meanwhile, the controller 260 controls the pumping flow rate of the first pump 212 according to the temperature of the steam produced in the first steam producing cycle 210.

Referring to FIG. 4, when a temperature T' of the steam produced in the first flash tank 211 is set to be higher, the sensible heat exchange amount $Q_1$ of the heat exchanger 232 is reduced. That is, when the temperature T' of the steam is set to be higher, T' in FIG. 4 is moved to the right so that the sensible heat exchange amount $Q_1$ of the heat exchanger 232 is reduced, and the condensed heat $Q_2$ of the condenser 233 is increased. Thus, the pumping flow rate of the first pump 212 is reduced, and the pumping flow rate of the second pump 222 is increased.

When the temperature of the steam produced in the first flash tank 211 is set to be lower, the sensible heat exchange amount $Q_1$ of the heat exchange 232 is increased. That is, when the temperature T' of the steam is set to be lower, T' in FIG. 4 is moved to the left so that the sensible heat exchange amount $Q_1$ of the heat exchanger 232 is increased, and the condensed heat $Q_2$ of the condenser 233 is decreased. The pumping flow rate of the first pump 212 is increased, and the pumping flow rate of the second pump 222 is decreased.

Figure 5:
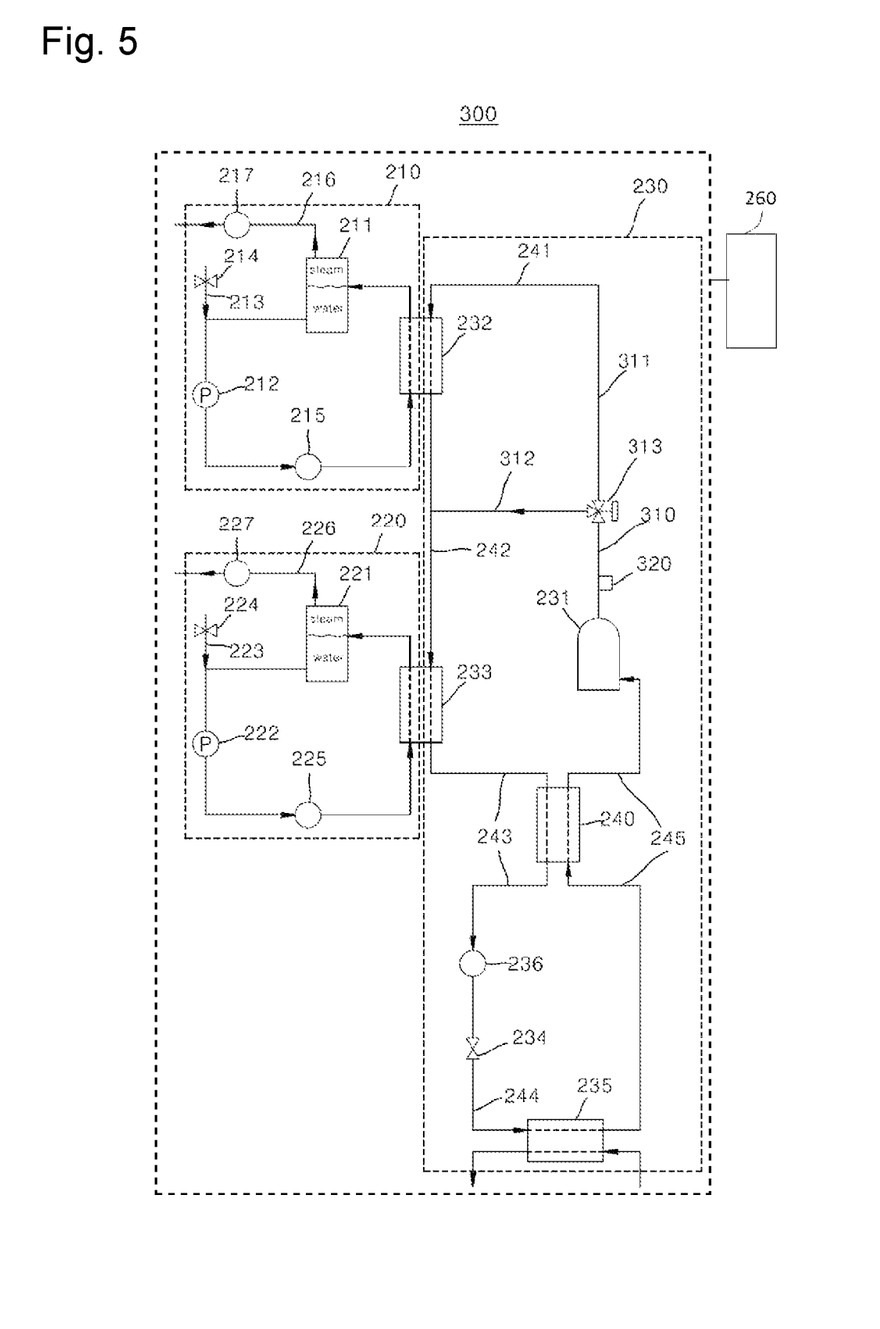
FIG. 5 is a view illustrating the configuration of a heat pump system for producing steam according to a third embodiment of the present invention.

FIG. 5 is a view illustrating the configuration of a heat pump system for producing steam according to a third embodiment of the present invention.

Referring to FIG. 5, a heat pump system 300 for producing steam according to the third embodiment of the present invention is different from the second embodiment in that a compressor discharge flow path 310 on which a refrigerant compressed by a compressor 231 is discharged, is diverged into a heat exchanger supply flow path 311 and a heat exchanger bypass flow path 312, a three way valve 313 is installed at a point where the compressor discharge flow path 310 is diverged into the heat exchanger supply flow path 311 and the heat exchanger bypass flow path 312 and the flow rate of the refrigerant supplied to a heat exchanger 232 and the condenser 233 can be controlled, and the remaining features and effects thereof are similar and thus, a detailed description thereof will be omitted.

Also, a temperature sensor 320 for measuring the temperature of the refrigerant discharged from the compressor 231 is installed on the compressor discharge flow path 310.

The three way valve 313 is a flow rate control valve that is capable of controlling a flow rate of each flow path.

The controller 260 controls an operation of the three way valve 313 according to the temperature sensed by the temperature sensor 320, thereby controlling the flow rate of the refrigerant supplied to the heat exchanger supply flow path 311 and the flow rate supplied to the heat exchanger bypass flow path 312.

Referring to FIG. 5, when the temperature sensed by the temperature sensor 320 is within a predetermined temperature range, the controller 260 controls the three way valve 313 to open both the heat exchanger supply flow path 311 and the heat exchanger bypass flow path 312.

In this case, the flow rate of the refrigerant supplied to the heat exchanger supply flow path 311 and the flow rate of the refrigerant supplied to the heat exchanger bypass flow path 312 may be controlled according to the temperature sensed by the temperature sensor 320.

For example, when the temperature sensed by the temperature sensor 320 is within the predetermined temperature range and is equal to or higher than a first predetermined temperature, the flow rate of the refrigerant supplied to the heat exchanger supply flow path 311 may be increased so that more steam at a comparatively high temperature can be produced in the first steam producing cycle 210.

In addition, when the temperature sensed by the temperature sensor 320 is within the predetermined temperature range and is less than the first predetermined temperature, the flow rate of the refrigerant supplied to the heat exchanger supply flow path 311 may also be reduced.

Meanwhile, when the present invention is not limited to the embodiment and a demand load of a first demander receiving steam from the first steam producing cycle 210 is large, the three way valve 313 may be controlled so as to increase the flow rate of the refrigerant supplied to the heat exchanger supply flow path 311.

Also, when a demand load of a second demander receiving steam form the second steam producing cycle 220 is small, the three way valve 313 may be controlled so as to increase the flow rate of the refrigerant supplied to the heat exchanger supply flow path 311.

In addition, when sufficient heat is not supplied to the first steam producing cycle 220, the three way valve 313 may be controlled so as to increase the flow rate of the refrigerant supplied to the heat exchanger supply flow path 311. Whether sufficient heat is supplied to the first steam producing cycle 220 may be determined by measuring the temperature of the first circulation water generated in the first heat exchanger 232 or the temperature of steam produced in the first flash tank 211 and by comparing the measured temperature of the first circulation water or temperature of the steam with a predetermined criterion.

In addition, when the demand load of the second demander is large, the three way valve 313 may be controlled so as to reduce the flow rate of the refrigerant supplied to the heat exchanger supply flow path 311.

Figure 6:
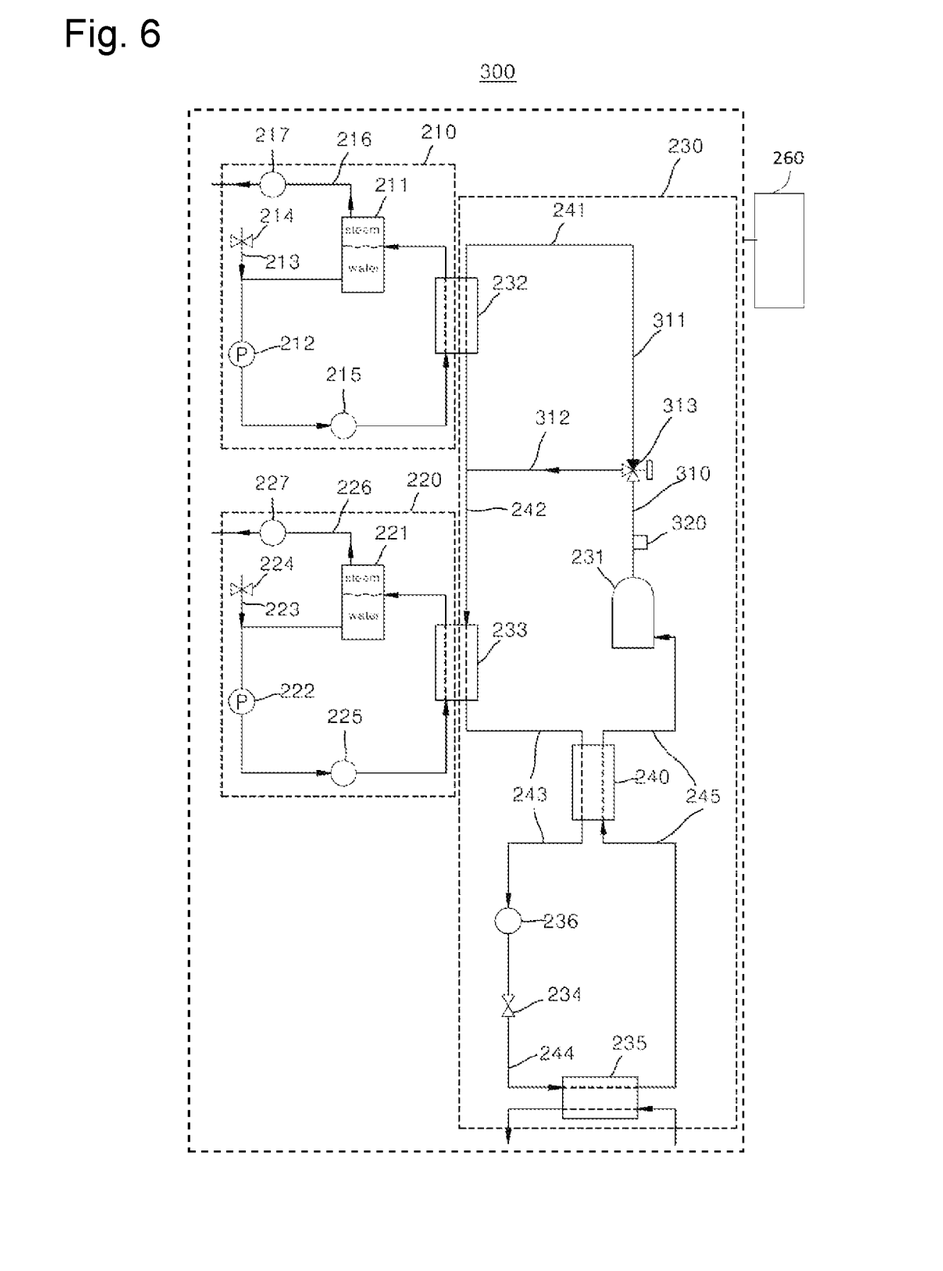
FIG. 6 is a view illustrating a state in which a heat exchanger supply flow path is closed and a heat exchanger bypass flow path is opened in FIG. 5.

Meanwhile, referring to FIG. 6, when the temperature sensed by the temperature sensor 320 is less than a second predetermined temperature, the controller 260 may control the three way valve 313 to close the heat exchanger supply flow path 311 and to open only the heat exchanger bypass flow path 312.

That is, the first steam producing cycle 210 is bypassed so that all of heat of the refrigerant generated in the compressor 231 can be supplied to the second steam producing cycle 220. Thus, steam at a sufficient temperature can be produced in the second steam producing cycle 220.

Even when the present invention is not limited to the embodiment and there is no demand load of the first demander, the controller 260 may control the three way valve 313 to close the heat exchanger supply flow path 311 and to open only the heat exchanger bypass flow path 312.

Figure 7:
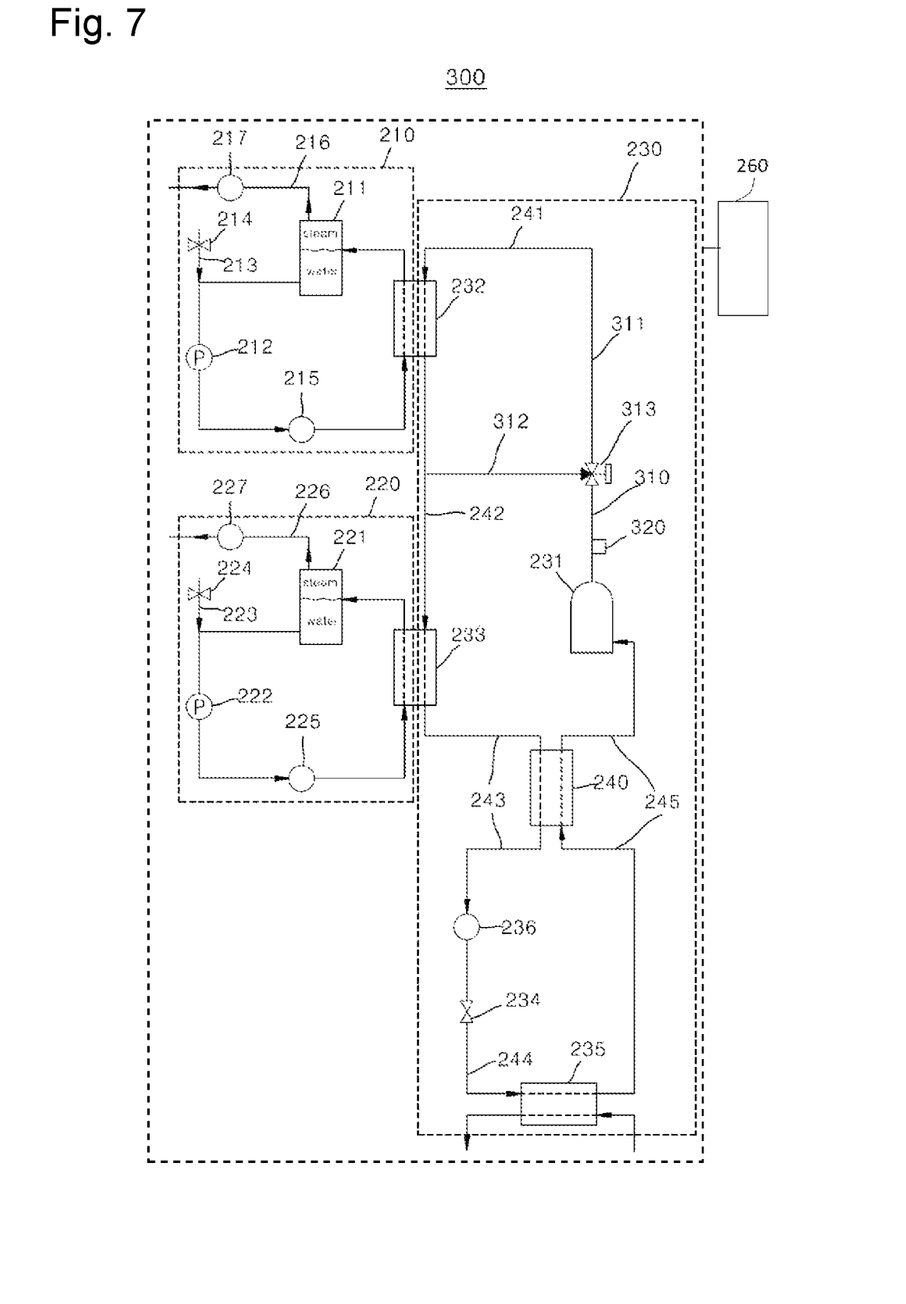
FIG. 7 is a view illustrating a state in which a heat exchanger supply flow path is opened and a heat exchanger bypass flow path is closed in FIG. 5.

Meanwhile, referring to FIG. 7, when the temperature sensed by the temperature sensor 320 is equal to or higher than the second predetermined temperature, the controller 260 may control the three way valve 313 to close the heat exchanger bypass flow path 312.

That is, when the temperature sensed by the temperature sensor 320 is equal to or higher than the second predetermined temperature, the controller 260 may determine that the temperature of the refrigerant generated in the compressor 231 is sufficiently high. Thus, the whole of the refrigerant generated in the compressor 231 passes through the heat exchanger 232 and the condenser 233 sequentially.

Thus, a sufficient amount of steam may be produced in both the first steam producing cycle 210 and the second steam producing cycle 220.

Meanwhile, the present invention is not limited to the embodiment, and the controller 260 may control the flow rate introduced into the heat exchanger supply flow path 311 and the heat exchanger bypass flow path 312 according to the flow rate of the steam measured by the first steam flowmeter 217 and the flow rate of the steam measured by the second steam flowmeter 227.

As described above, in the third embodiment of the present invention, steam having different temperatures may be produced by using first and second steam producing cycles 210 and 220, and steam production efficiency may be improved by controlling the flow rate of the refrigerant introduced into the heat exchanger 232 according to the temperature of the refrigerant discharged from the compressor 231.

Meanwhile, the present invention is not limited to the embodiment, and the controller 260 may control the opening degree of the three way valve 313 according to the temperature of the steam produced in the first steam producing cycle 210. When the temperature of the steam produced in the first flash tank 211 is set to be high, a sensible heat exchange amount of the heat exchanger 232 is reduced so that the flow rate of the refrigerant supplied to the heat exchanger supply flow path 311 can be reduced and the flow rate of the refrigerant supplied to the heat exchanger bypass flow path 312 can be increased. Also, when the temperature of the steam produced in the first flash tank 211 is set to be low, a sensible heat exchange amount of the heat exchanger 232 is increased so that the flow rate of the refrigerant supplied to the heat exchanger supply flow path 311 can be increased and the flow rate of the refrigerant supplied to the heat exchanger bypass flow path 312 can be reduced.

Figure 8:
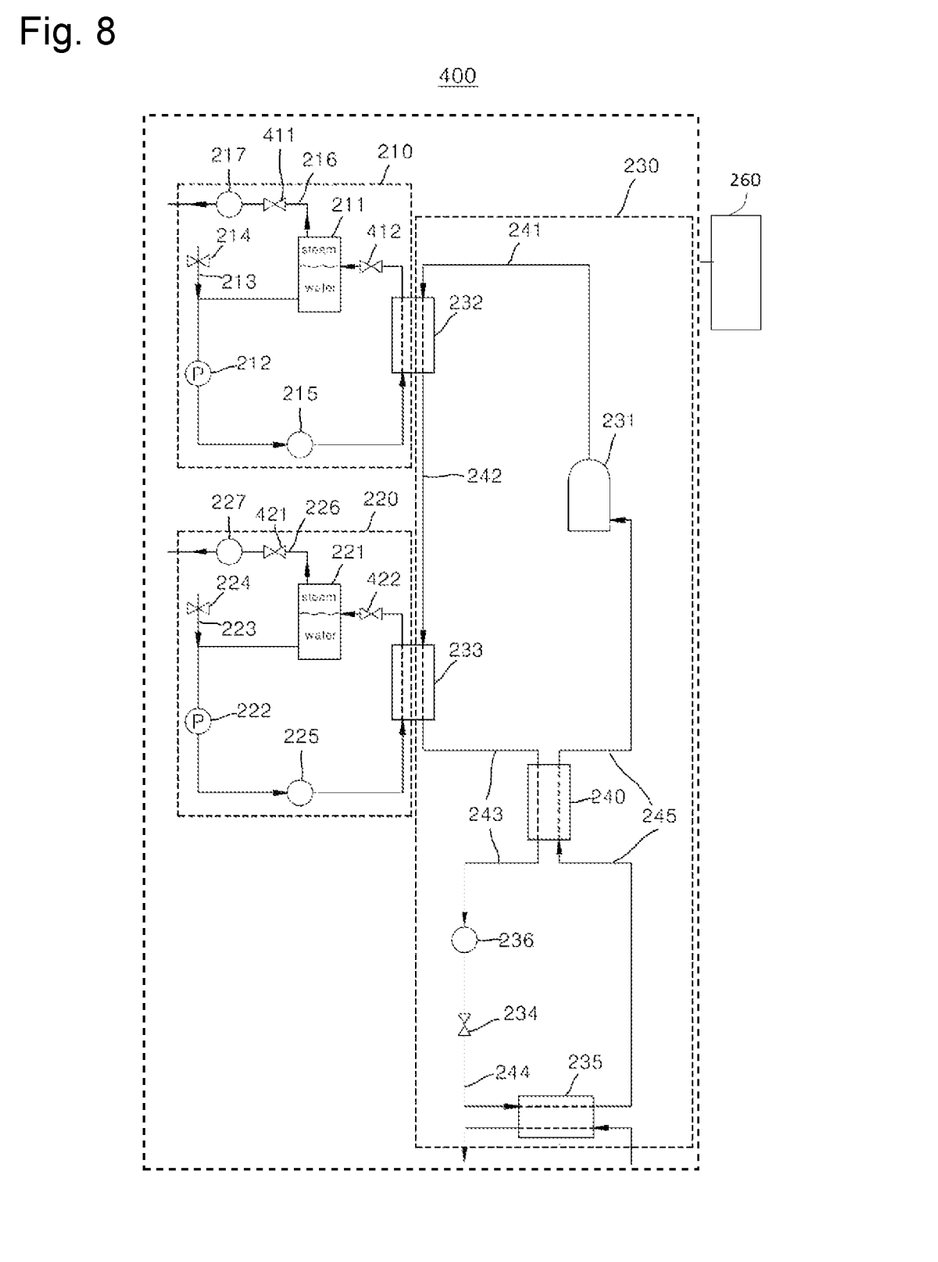
FIG. 8 is a view illustrating the configuration of a heat pump system for producing steam according to a fourth embodiment of the present invention.

FIG. 8 is a view illustrating the configuration of a heat pump system for producing steam according to a fourth embodiment of the present invention.

Referring to FIG. 8, a heat pump system 400 for producing steam according to the fourth embodiment of the present invention is different from the second embodiment in that the first steam producing cycle 210 further includes a first pressure control valve 411 installed on a first steam discharge flow path 216 and a second pressure control valve 412 installed on a flow path for connecting the heat exchanger 232 to the first flash tank 211 and the second steam producing cycle 220 further includes a third pressure control valve 421 installed on a second steam discharge flow path 226 and a fourth pressure control valve 422 installed on a flow path for connecting the condenser 233 to the second flash tank 221, and the remaining features and effects thereof are similar to those of the second embodiment and thus, only different features will be described in detail.

A method for controlling the first steam producing cycle 210 by using the controller 260 will be described as below.

An example in which the controller 260 controls the opening degree of the first pressure control valve 411 according to the pressure of the first flash tank 211 and controls the amount of the opening degree of the second pressure control valve 412 according to a change of the flow rate measured by the first circulation water flowmeter 215, will be described.

That is, the controller 260 reduces the opening degree of the first pressure control valve 411 so that the pressure of the first flash tank 211 is equal to or greater than a first predetermined pressure. When an internal pressure of the flash tank 211 is less than the first predetermined pressure, the temperature of steam in the flash tank 211 is fallen. Thus, the internal pressure of the flash tank 211 needs to be equal to or greater than a predetermined pressure so that the temperature of steam produced in the flash tank 211 can be elevated.

Also, the controller 260 controls the amount of the opening degree of the second pressure control valve 412 according to a change of the flow rate measured by the first circulation water flowmeter 215. That is, in the first steam producing cycle 210, when the temperature of the steam is elevated by receiving heat from the heat exchanger 232 and exceeds a saturation temperature, there is the concern about the occurrence of vaporization in the heat exchanger 232. Fluctuation of the flow rate measured by the first circulation water flowmeter 215 may be checked so that it may be determined whether vaporization occurs in the heat exchanger 232. Thus, when fluctuation of the flow rate measured by the first circulation water flowmeter 215 exceeds a predetermined range, the opening degree of the second pressure control valve 412 is reduced.

Also, a method for controlling the second steam producing cycle 220 by using the controller 260 will be described as below.

An example in which the controller 260 controls the opening degree of the third pressure control valve 421 according to the pressure of the second flash tank 221 and controls the amount of the opening degree of the fourth pressure control valve 422 according to a change of the flow rate measured by the second circulation water flowmeter 225, will be described.

That is, the controller 260 reduces the opening degree of the third pressure control valve 421 so that the pressure of the second flash tank 221 is equal to or greater than a second predetermined pressure.

In addition, the controller 260 controls the amount of the opening degree of the fourth pressure control valve 422 according to a change of the flow rate measured by the second circulation water flowmeter 225. That is, in the first steam producing cycle 210, when the temperature of the steam is elevated by receiving heat from the condenser 233 and exceeds a saturation temperature, there is the concern about the occurrence of vaporization in the condenser 233. Fluctuation of the flow rate measured by the second circulation water flowmeter 225 may be checked so that it may be determined whether vaporization occurs in the condenser 233. Thus, when fluctuation of the flow rate measured by the second circulation water flowmeter 225 exceeds a predetermined range, the opening degree of the fourth pressure control valve 422 is reduced.

Meanwhile, the present invention is not limited to the embodiment, and another example in which the controller 260 controls the first steam producing cycle 210, will be described.

Of course, the controller 260 may control the amount of the opening degree of the second pressure control valve 412 according to the temperature or pressure of the first circulation water introduced into the second pressure control valve 412.

That is, the temperature of the first circulation water that passes through the heat exchanger 232 and is introduced into the second pressure control valve 412, is measured, and a saturation pressure according to the measured temperature is calculated to reduce the opening degree of the second pressure control valve 412 so that a pressure equal to or greater than the saturation pressure can be maintained. When the pressure equal to or greater than the saturation pressure is maintained, the first circulation water supplied to the first flash tank 211 may be supplied in a fully-liquefied state. When the pressure is less than the saturation pressure, part of the first circulation water may be vaporized before being supplied to the first flash tank 211, lowering of steam production efficiency in which pressure fluctuation occurs, a flow speed is increased and friction occurs, may occur.

Also, another example in which the controller 260 controls the second steam producing cycle 220, will be described.

Of course, the controller 260 may control the amount of the opening degree of the fourth pressure control valve 422 according to the temperature or pressure of the second circulation water introduced into the fourth pressure control valve 422.

That is, the temperature of the second circulation water that passes through the condenser 233 and is introduced into the fourth pressure control valve 422 is measured, and the saturation pressure according to the measured temperature is calculated, and the opening degree of the fourth pressure control valve 422 is reduced so that the pressure is maintained under the saturation pressure or higher. When the pressure is maintained under the saturation pressure or higher, the second circulation water supplied to the second flash tank 221 may be supplied in a fully-liquefied state. When the pressure is less than the saturation pressure, part of the second circulation water may be vaporized before being supplied to the second flash tank 221, lowering of steam production efficiency in which pressure fluctuation occurs, a flow speed is increased and friction occurs, may occur.

In addition, the present invention is not limited to the embodiment, and a heat exchanger bypass flow path (not shown) that is diverged from the compressor discharge flow path 241, bypasses the heat exchanger 232 and guides the refrigerant to the condenser 233, may be further included, and the controller 260 may control so that all or part of the refrigerant discharged from the compressor 231 bypasses the heat exchanger 231.

Figure 9:
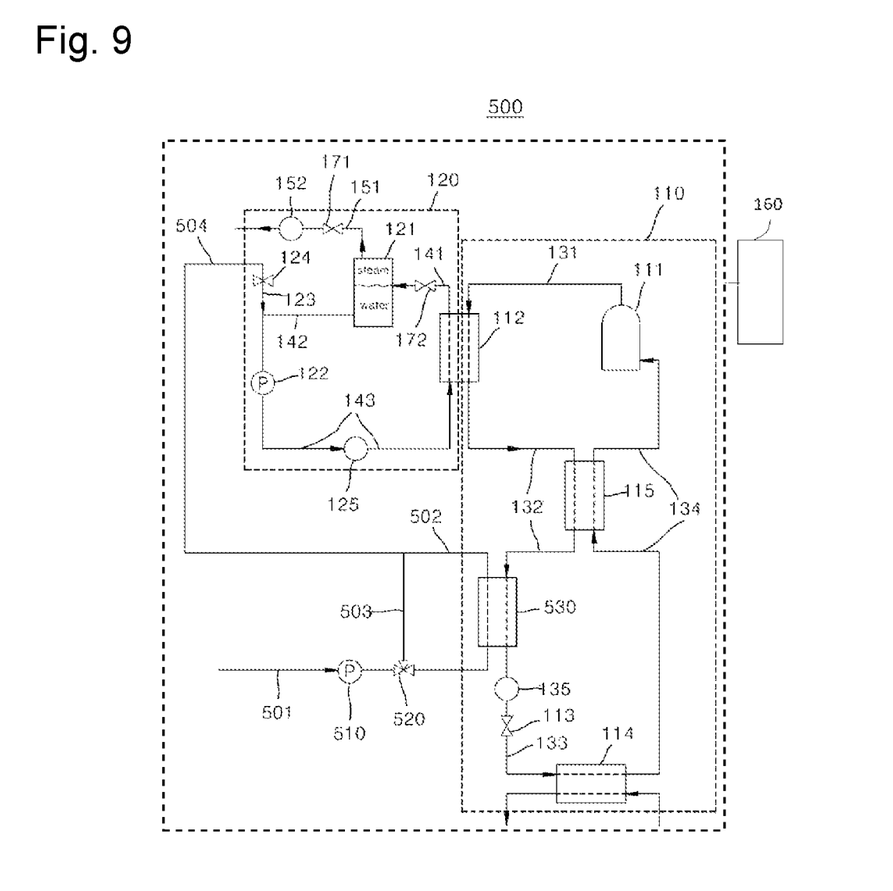
FIG. 9 is a view illustrating the configuration of a heat pump system for producing steam according to a fifth embodiment of the present invention.

FIG. 9 is a view illustrating the configuration of a heat pump system for producing steam according to a fifth embodiment of the present invention.

Referring to FIG. 9, a heat pump system 500 for producing steam according to the fifth embodiment of the present invention is different from the first embodiment in that the heat pump system 500 for producing steam according to the fifth embodiment of the present invention further includes a make-up water preheater 530, the make-up water preheater 530 heat-exchanges a refrigerant that is generated in the recuperator 115 and before flowing into an expansion device 113 with make-up water supplied to the steam producing cycle 120 and the refrigerant is additionally supercooled and the make-up water is capable of being preheated, and only different features will be described in detail.

The heat pump system 500 for producing steam further includes a water supply flow path 501, a make-up water supply pump 510, a make-up water preheating flow path 502, a make-up water preheater 530, a make-up water preheater bypass flow path 503, and a make-up water supply flow path 504.

The water supply flow path 501 is a flow path on which make-up water is supplied from the outside. The water supply flow path 501 is diverged into the make-up water preheating flow path 502 and the make-up water preheater bypass flow path 503.

A three way valve 520 is installed at a point where the water supply flow path 501 is diverged into the make-up water preheating flow path 502 and the make-up water preheater bypass flow path 503.

The make-up water preheating flow path 502 is a flow path diverged from the water supply flow path 501 and guiding the make-up water to pass through the make-up water preheater 530.

The make-up water preheater 530 is a heat exchanger that heat-exchanges the make-up water with the refrigerant supercooled by the recuperator 115.

The make-up water preheating flow path 502 and the make-up water preheater bypass flow path 503 may be connected to each other via the make-up water supply flow path 504 so that the make-up water can be supplied to a previous part of the circulation water pump 122.

As described above, the make-up water supplied from the outside and supplied into the steam producing cycle 120 is heat-exchanged with the refrigerant supercooled by the recuperator 115 so that the refrigerant before flowing into the expansion device 113 can be additionally supercooled. The refrigerant is additionally supercooled so that the quality of the refrigerant introduced into the evaporator 114 can be minimized, and the temperatures at an inlet and an outlet of the compressor 111 can be elevated.

Also, the make-up water is preheated and supplied so that the temperature of the circulation water introduced into the flash tank 121 can be further elevated and thus a steam production rate in the flash tank 121 can be increased.

The controller 160 may control the three way valve 520 to control the flow rate of the make-up water introduced into the make-up water preheater 530 and the flow rate that bypasses the make-up water preheater 530. The controller 160 may control the three way valve 520 according to the temperature of the make-up water. That is, when the temperature of the make-up water is higher than a predetermined make-up water highest temperature, the effects of additionally supercooling the refrigerant by using the make-up water preheater 530 disappear and thus, the controller 160 may control the three way valve 520 so that the make-up water bypasses the make-up water preheater 530. Meanwhile, when the temperature of the make-up water is lower than a predetermined make-up water lowest temperature, the controller 160 may control the three way valve 520 so that all of the make-up water may pass through the make-up water preheater 530. Also, of course, the flow rate introduced into the make-up water preheater 530 and the flow rate that bypasses the make-up water preheater 530 may also be properly controlled according to the temperature of the make-up water.

While the present invention has been particularly shown and described with reference to exemplary embodiments thereof, it will be understood by those of ordinary skill in the art that various changes in form and details may be made therein without departing from the spirit and scope of the present invention as defined by the following claims.

According to the present invention, a heat pump system for producing steam, in which steam production efficiency can be further improved, can be manufactured.

The invention claimed is:

1. A heat pump system for producing steam by using a recuperator, the heat pump system comprising:
  a refrigerant cycle, which comprises a compressor compressing a refrigerant, a condenser condensing the refrigerant generated in the compressor, an expansion device expanding the refrigerant generated in the condenser and an evaporator evaporating the refrigerant generated in the expansion device and in which the refrigerant circulates;
  a steam producing cycle, which comprises a flash tank generating steam by decompressing circulation water heated while passing through the condenser and a pump pumping the circulation water venerated in the flash tank so as to circulate the circulation water into the condenser and in which the circulation water is circulated so that the steam is capable of being produced;
  a recuperator, which is provided within the refrigerant cycle, heat-exchanges the refrigerant generated in the condenser with the refrigerant introduced into the compressor so as to supercool the refrigerant generated in the condenser and elevates temperatures at an inlet and an outlet of the compressor so as to increase condensed heat of the condenser;
  a make-up water injecting part making-up water from an outside into the steam producing cycle;
  a make-up water valve controlling a flow rate of the make-up water injecting part; and
  a controller controlling an amount of an opening degree of the make-up water valve according to a water level of the flash tank.

2. The heat pump system of claim 1, further comprising:
  a water supply flow path on which make-up water is supplied from the outside;
  a make-up water preheater heat-exchanging the make-up water with the refrigerant supercooled by the recuperator;
  a make-up water preheating flow path diverged from the water supply flow path and guiding the make-up water to pass through the make-up water preheater;
  a make-up water preheater bypass flow path which is diverged from the water supply flow path and on which the make-up water bypasses the make-up water preheater; and
  a three way valve installed at a point where the make-up water preheating flow path and the make-up water preheater bypass flow path are diverged from the water supply flow path and controlling a flow rate of a make-up water introduced into the make-up water preheater and a flow rate of a make-up water bypassing the make-up water preheater.

3. A heat pump system for producing steam by using a recuperator, the heat pump system comprising:
  a refrigerant cycle, which comprises a compressor compressing a refrigerant, a heat exchanger heat-exchanging the refrigerant generated in the compressor with first circulation water, a condenser condensing the refrigerant by heat-exchanging the refrigerant generated in the heat exchanger with second circulation water, an expansion device expanding the refrigerant generated in the condenser and an evaporator evaporating the refrigerant generated in the expansion device and in which the refrigerant circulates;

a first steam producing cycle, which comprises a first flash tank generating first steam by decompressing the first circulation water heated while passing through the heat exchanger and a first pump pumping the first circulation water generated in the first flash tank so as to circulate the first circulation water into the heat exchanger and in which the first circulation water is circulated so that the first steam is capable of being produced;

a second steam producing cycle, which comprises a second flash tank generating second steam by decompressing the second circulation water heated while passing through the condenser and a second pump pumping the second circulation water generated in the second flash tank so as to circulate the second circulation water into the condenser and in which the second circulation water is circulated so that the second steam is capable of being produced; and a recuperator, which is provided within the refrigerant cycle, heat-exchanges the refrigerant generated in the condenser with the refrigerant introduced into the compressor so as to supercool the refrigerant generated in the condenser and elevates temperatures at an inlet and an outlet of the compressor so as to increase condensed heat of the condenser.

4. The heat pump system of claim 3, further comprising:
a compressor discharge flow path on which the refrigerant compressed by the compressor is discharged;
a heat exchanger supply flow path diverged from the compressor discharge flow path and guiding the refrigerant discharged from the compressor into the heat exchanger;
a heat exchanger bypass flow path, which is diverged from the compressor discharge flow path and on which the refrigerant discharged from the compressor bypasses the heat exchanger and is supplied to the condenser; and
a three way valve installed at a point where the heat exchanger supply flow path and the heat exchanger bypass flow path are diverged from the compressor discharge flow path and controlling a flow rate of the refrigerant supplied to the heat exchanger and a flow rate of the refrigerant bypassing the heat exchanger.

5. The heat pump system of claim 4, further comprising:
a temperature sensor measuring a temperature of the refrigerant discharged from the compressor; and
a controller controlling the three way valve so as to control a flow rate introduced into the heat exchanger supply flow path according to the temperature sensed by the temperature sensor and a flow rate introduced into the heat exchanger bypass flow path.

6. The heat pump system of claim 4, further comprising:
a temperature sensor measuring a temperature of the refrigerant discharged from the compressor; and
a controller controlling the three way valve so as to close the heat exchanger supply flow path when the temperature sensed by the temperature sensor is less than a predetermined temperature.

7. The heat pump system of claim 4, further comprising a controller controlling the three way valve so as to control a flow rate introduced into the heat exchanger supply flow path according to a temperature of the steam produced in the first flash tank and a flow rate introduced into the heat exchanger bypass flow path.

8. The heat pump system of claim 3, further comprising:
a first make-up water injecting part making-up water from an outside into the first steam producing cycle;
a first make-up water valve controlling a flow rate of the first make-up water injecting part; and
a controller controlling an amount of an opening degree of the first make-up water valve according to a water level of the first flash tank.

9. The heat pump system of claim 3, further comprising:
a second make-up water injecting part making-up water from an outside into the second steam producing cycle;
a second make-up water valve controlling a flow rate of the second make-up water injecting part; and
a controller controlling an amount of an opening degree of the second make-up water valve according to a water level of the second flash tank.

10. The heat pump system of claim 4, further comprising:
a temperature sensor measuring a temperature of the refrigerant discharged from the compressor; and
a controller controlling the three way valve to open both the heat exchanger supply flow path and the heat exchanger bypass flow path when the temperature sensed by the temperature sensor is within a predetermined temperature range.

11. The heat pump system of claim 4, further comprising:
a temperature sensor measuring a temperature of the refrigerant discharged from the compressor; and
a controller controlling the three way valve so as to close the heat exchanger bypass flow path when the temperature sensed by the temperature sensor is equal to or higher than a predetermined temperature.

* * * * *